United States Patent
Jeoung et al.

(10) Patent No.: US 7,649,585 B2
(45) Date of Patent: Jan. 19, 2010

(54) LIQUID CRYSTAL DISPLAY SUBSTRATE AND ITS MANUFACTURING METHOD

(75) Inventors: Hun Jeoung, Gyeongsangbuk-do (KR); Jeong Woo Jang, Daegu-si (KR)

(73) Assignee: LG. Display Co., Ltd., Seoul (KR)

( * ) Notice: Subject to any disclaimer, the term of this patent is extended or adjusted under 35 U.S.C. 154(b) by 852 days.

(21) Appl. No.: 11/002,019

(22) Filed: Dec. 2, 2004

(65) Prior Publication Data
US 2005/0243267 A1    Nov. 3, 2005

(30) Foreign Application Priority Data
Apr. 29, 2004    (KR)    ........................ 10-2004-0030190

(51) Int. Cl.
*G02F 1/1333* (2006.01)
(52) U.S. Cl. ............................. 349/54; 349/40; 349/187
(58) Field of Classification Search .................... 349/40, 349/54
See application file for complete search history.

(56) References Cited

U.S. PATENT DOCUMENTS 6,111,620 A * 8/2000 Nishiki et al. .................. 349/54
6,172,410 B1    1/2001 Nagata et al.

FOREIGN PATENT DOCUMENTS

JP    H10-268273    10/1998
JP    2003-215627    7/2003

OTHER PUBLICATIONS

Office Action for corresponding Korean Patent Application Serial No. 9-5-2007-0663883278, dated Dec. 10, 2007.
Correspondence from foreign associate dated Jul. 2, 2007 regarding corresponding Chinese Patent Application No. 200410104985.9.

* cited by examiner

*Primary Examiner*—Richard H Kim
(74) *Attorney, Agent, or Firm*—Brinks Hofer Gilson & Lione (57) ABSTRACT

An LCD substrate including multiple LCD panels may be cut along a scribing boundary. All or part of one or more test pads or test signal lines may extend in whole or in part across the scribing boundary. When the LCD substrate is cut along the scribing boundary, the test pads or test signal lines are cut or removed.

6 Claims, 6 Drawing Sheets

LIQUID CRYSTAL DISPLAY SUBSTRATE AND ITS MANUFACTURING METHOD

PRIORITY CLAIM

This application claims the benefit of Korean Application No. P2004-30190, filed on Apr. 29, 2004, which is hereby incorporated by reference as if fully set forth herein.

BACKGROUND

1. Technical Field

The present invention relates to liquid crystal displays (LCDs), and more particularly, to an LCD substrate structure and fabrication method.

2. Related Art

As modern societies are changing into information societies, LCDs are emerging as an important replacement display technology for cathode ray tube (CRT) technology. While a CRT has performance and price benefits, the CRT also has significant drawbacks with regard to miniaturization and mobility. On the other hand, the LCD module provides size, weight, and power consumption advantages over the CRT.

An LCD panel includes an array substrate, a color filter substrate coupled with the array substrate and liquid crystal interposed between the array and color filter substrates. The array substrate may include an array of thin film transistors. The color filter substrate may include red (R), green (G), and blue (B) (RGB) color filter layers.

LCD panels may be fabricated by forming multiple separate transistor arrays on a first substrate, and by forming multiple corresponding color filter areas on a second glass substrate. The glass substrates are coupled together. The glass substrates are then cut into individual LCD panels.

When the pair of glass substrates are cut into the LCD panels, the glass substrates are cut in a first direction to form bar-shaped liquid crystal cells spanning multiple LCD panels. Then, liquid crystals are injected between upper and lower substrates of each bar-shaped liquid crystal cell. The cells are sealed to prevent leakage of the liquid crystals. After sealing, the bar-shaped liquid crystal cells are inspected and tested, and cut in a second direction perpendicular to the first direction to form separate individual LCD panels.

A scribing process cuts the cells into individual LCD panels. The edges of the LCD panels are then ground. The grinding process removes shorting bars provided in the liquid crystal cell that prevent static electricity discharges. The grinding process also removes portions of signal lines that were used for inspection and testing of the LCD panels while in the form of the bar-shaped liquid crystal cells.

Figure 1:
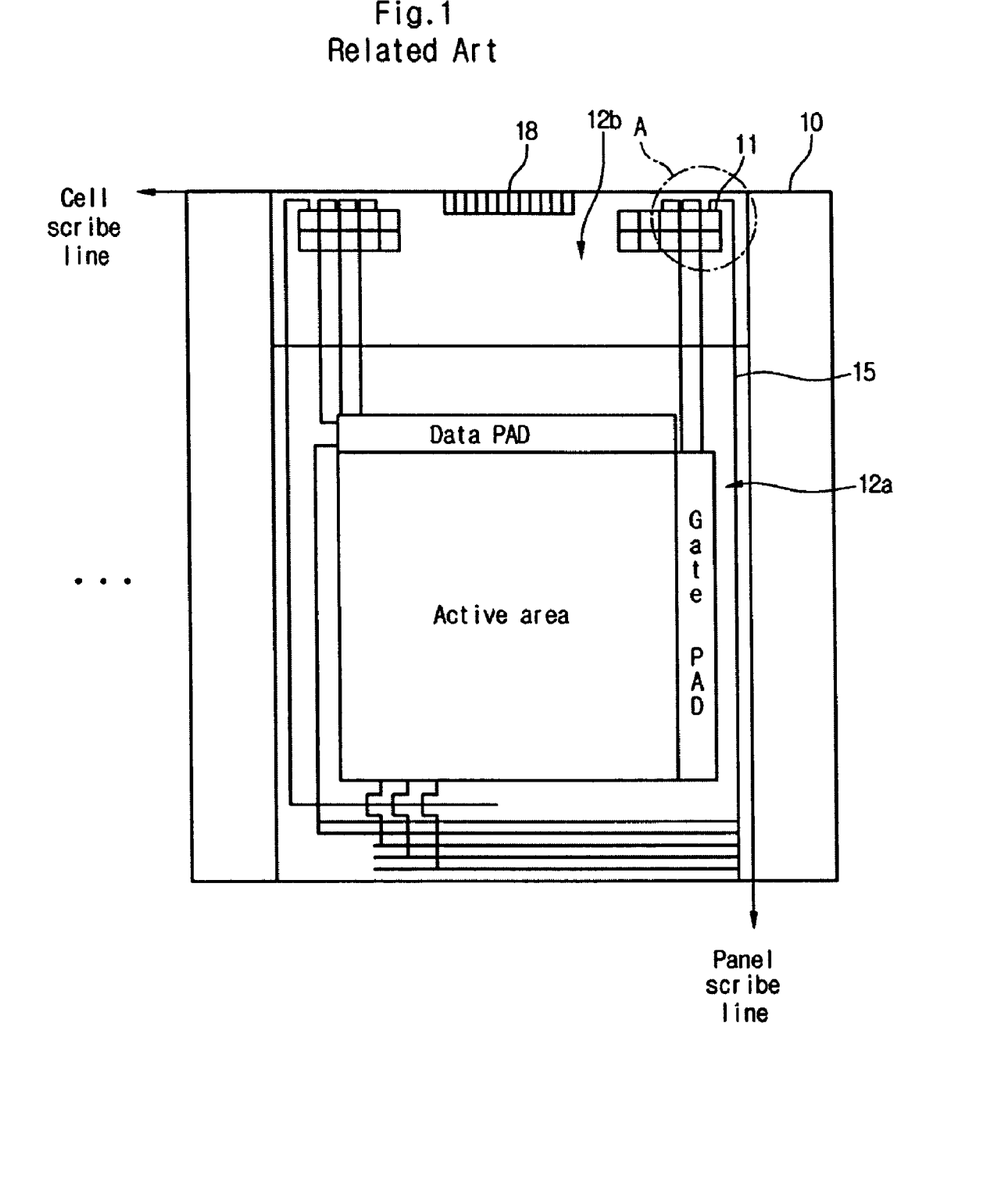
FIG. 1 illustrates a portion of a liquid crystal cell.

FIG. 1 shows a portion of a cell 10. The first scribe line shows the direction that the substrates are cut to form the cell 10. The second scribe line shows the direction that the cell 10 is cut to separate the cell into individual LCD panels. The transistor array for a given LCD is shown by the active area 12a. The inactive area outside of the active area is labeled 12b.

The active area 12a of each LCD in the cell 10 may be tested prior to separating the cell into individual panels. During testing, drive signals and RGB data signals are applied via signal lines 15 and inspection pads 11. The signal lines 15 and inspection pads 11 are formed in the inactive area 12b.

The signal lines 15 are electrically connected with data pads, gate pads, and control pads. Alternatively, some LCD cells may provide a connection terminal 18 through which test data and control signals may be applied. Through the signal lines 15, test data signals and gate signals are applied to the thin film transistors in the active area 12a. The test data signals and gate signals activate or deactivate pixels in the LCD to determine whether any pixels are defective.

Figure 2:
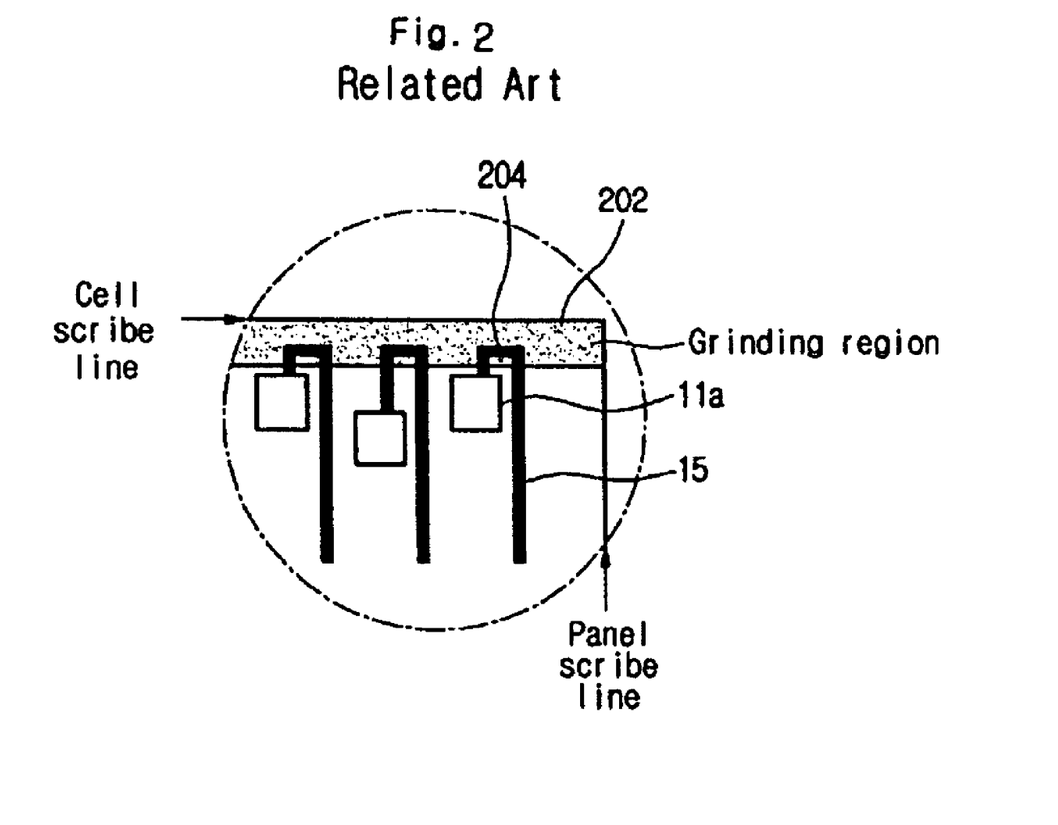
FIG. 2 is an enlarged view of the area A shown in FIG. 1.

FIG. 2 is an enlarged view of the area A shown in FIG. 1. FIG. 2 shows the grinding region 202 that is removed in the grinding process. FIG. 2 also shows that the inspection pads include multiple individual test pads 11a. The test pads 11a are electrically connected with the signal lines 15. The test pads 11a may provide an injection point for pixel data signals, transistor gate signals, control signals, or other types of test signals.

If the active area 12a passes inspection, grinding is performed to break the signal lines 15. As noted above, the signal lines provide the test signals for the active area 12a. The signal lines 15 are not necessary for normal operation of the LCD panel.

A portion 204 of each of each signal line 15 is formed adjacent to the first scribe line and inside the grinding region 202. The grinding process breaks the portions 204 of the signal lines 15 inside the grinding region 202. The LCD panels are complete after grinding and after scribing along the second scribe line.

Prior processes for producing LCD panels performed a large number of process steps. The process steps included scribing to form the cells, scribing to form the individual panels, and grinding. As the number of process steps increases, yield and throughput may drop. The large number of process steps is particularly disadvantageous in fabricating smaller LCD panels because many smaller panels may need to be cut and ground when starting with large substrates.

SUMMARY

This invention may reduce the number of process steps employed to fabricate an LCD panel. The invention may increase yield and lower manufacturing cost. The invention may provide an LCD substrate for which no grinding step is necessary.

An LCD substrate structure includes an inspection pad, a signal line connected with the inspection pad, and an active area connected to the signal line. The signal line may include a line extension portion. The line extension portion may extend across a scribing boundary of the LCD substrate. The inspection pad may lie outside the scribing boundary. When the LCD substrate is cut along the scribing boundary, the line extension portion may be cut and the inspection pad may be removed.

An LCD manufacturing method includes obtaining a first substrate. The first substrate may include an inspection pad that lies outside a scribing boundary or a signal line extension portion that extends across the scribing boundary. The method may also include cutting the cut substrate along the scribing boundary to cut the signal lines or remove the inspection pad.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention, wherein.

DETAILED DESCRIPTION

One or more LCD panels may be defined on a first substrate on which thin film transistors and pixel electrodes may be formed, and a second substrate on which color filter layers may be formed. The first and second substrates are coupled together. The substrates may then be cut along a cell scribing boundary into strips called "cells". A cell may include multiple LCD panels.

Figure 3:
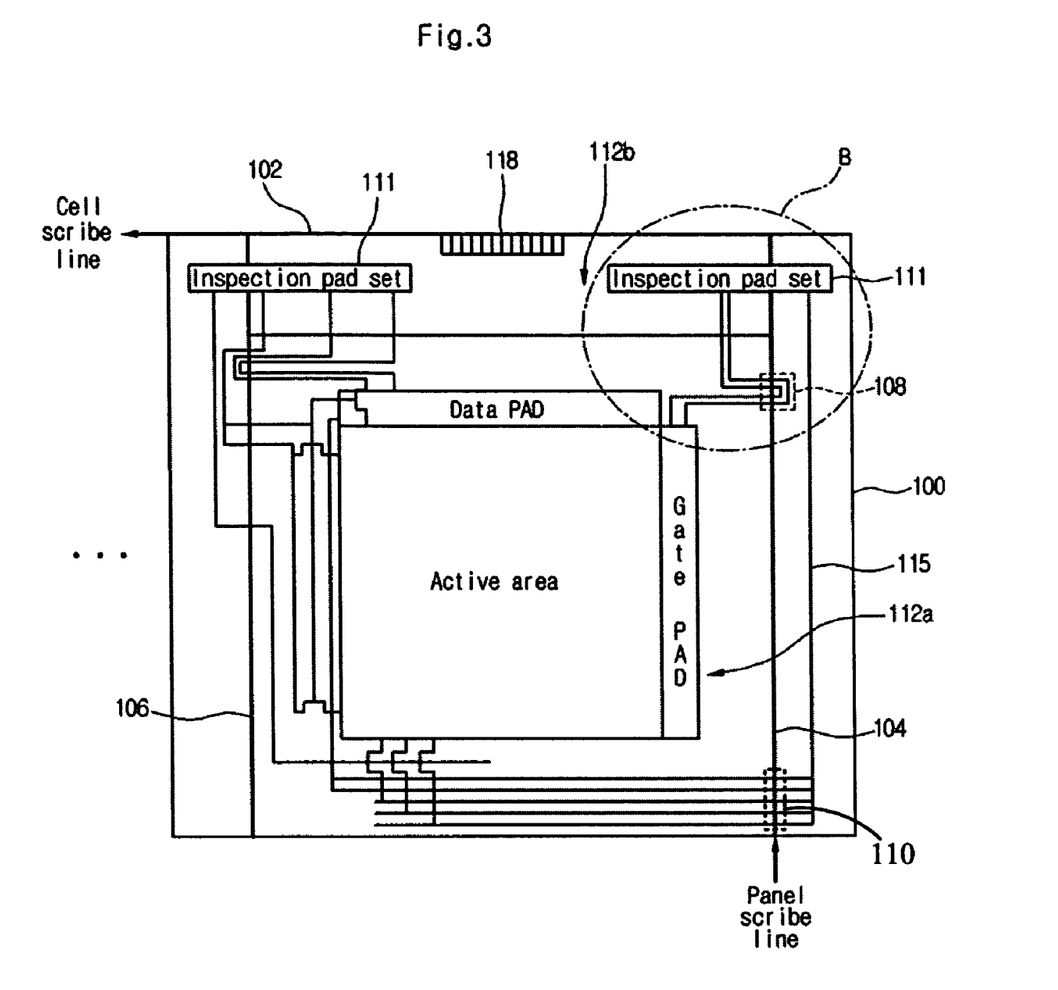
FIG. 3 illustrates a portion of a liquid crystal cell.

FIG. 3 illustrates a portion of a liquid crystal cell 100. The cell 100 may be obtained from a larger substrate by cutting the larger substrate along the cell scribing line 102. The cell 100 may include multiple LCD panels formed in the direction of the cell scribing line. The LCD panel shown in FIG. 3 includes an active area 112a and an inactive area 112b. The active area 112a may include switching transistors, pixel electrodes, gate lines, data lines, control circuits, or other circuits or logic. The active area 112a may provide the circuits and logic that activate or deactivate pixels in a completed LCD panel.

The inactive area 112b may be the area around the active area 112a. The inactive area 112b may include circuits or logic that are not activate during the normal operation of a completed LCD panel. The inactive area 112b may include an inspection pad set 111 and signal lines 115.

The inspection pad set 111 and signal lines 115 may accept test signals. The test signals may activate one or more pixels in the active area 112a, for example, to test the pixels in the LCD panel. One or more of the LCD panels in the cell 100 may include inspection pads and signal lines coupled to the inspection pads.

Panel scribe lines 104 and 106 are labeled in FIG. 3. The panel scribe lines 104 and 106 may intersect (e.g., perpendicularly) the cell scribe line 102. Individual LCD panels may be obtained by cutting along scribing boundaries such as those defined by the cell scribe line 102 and the panel scribe lines 104 and 106. The scribing boundaries may delineate an LCD panel.

The inspection pad set 111 may extend across a scribing boundary. In the inspection pad set 111, one or more inspection pads may be outside the scribing boundary, while one or more inspection pads may be inside the scribing boundary. Also, one or more signal lines 115 may include signal extension portions that extend across the scribing boundary. Extension portions 108 and 110 are labeled in FIGS. 3 and 4.

The inspection pads may be connected to the signal lines 115. The signal lines 115 may be connected with gate, data, control, or other connections formed in or around the active area 112a. In testing the LCD panel, one or more pixels in the active area 112a may be activated using the signal lines 115 and inspection pad set 111. The inspection pads and signal lines may also be used to test circuitry or logic outside the active area 112a.

When the liquid crystal cell 100 is cut along the panel scribe line 104, one or more of the signal lines 115 may be cut, broken, or otherwise disconnected. The cut may terminate the signal lines 115 at the scribing boundary established by the scribing line 104. Alternatively or additionally, one or more of the inspection pads may be removed from the LCD substrate. The grinding process may be omitted.

Liquid crystal may be injected into the liquid crystal cell 100 after scribing along the cell scribing line 102. The cell 100 may then be sealed. Cell inspection may be performed to test one or more of the LCD panels in the cell 100.

The cell inspection may be performed by applying inspection signals such as transistor gate signals and data signals through the inspection pads to the active area 112a. The inspection signals may activate or deactivate transistors and may turn one or more pixels on or off. The response of the active area 112a may be monitored to determine if the LCD panel is operating acceptably.

After inspection, the liquid crystal cell 100 may be cut or scribed along a second scribe boundary, such as that defined by the scribe lines 104 and 106. Cutting along the second scribe lines may divide the cell 100 into one or more LCD panels. Any inspection pads that extend in whole or in part across a scribing boundary are wholly or partially removed from the LCD panel. Similarly, any signal line portions 108 that extend across the scribing boundary are cut. In other words, a grinding process is not required to disconnect the inspection pads 111 or their signal lines 115.

A connection terminal 118 may be provided. The connection terminal 118 may provide alternative or additional input connections for inspection signals to reach the active area 112a. Signal lines coupled to the connection terminal 118 may extend across a scribing boundary and may be cut when the LCD panel is separated from the cell 100.

Figure 4:
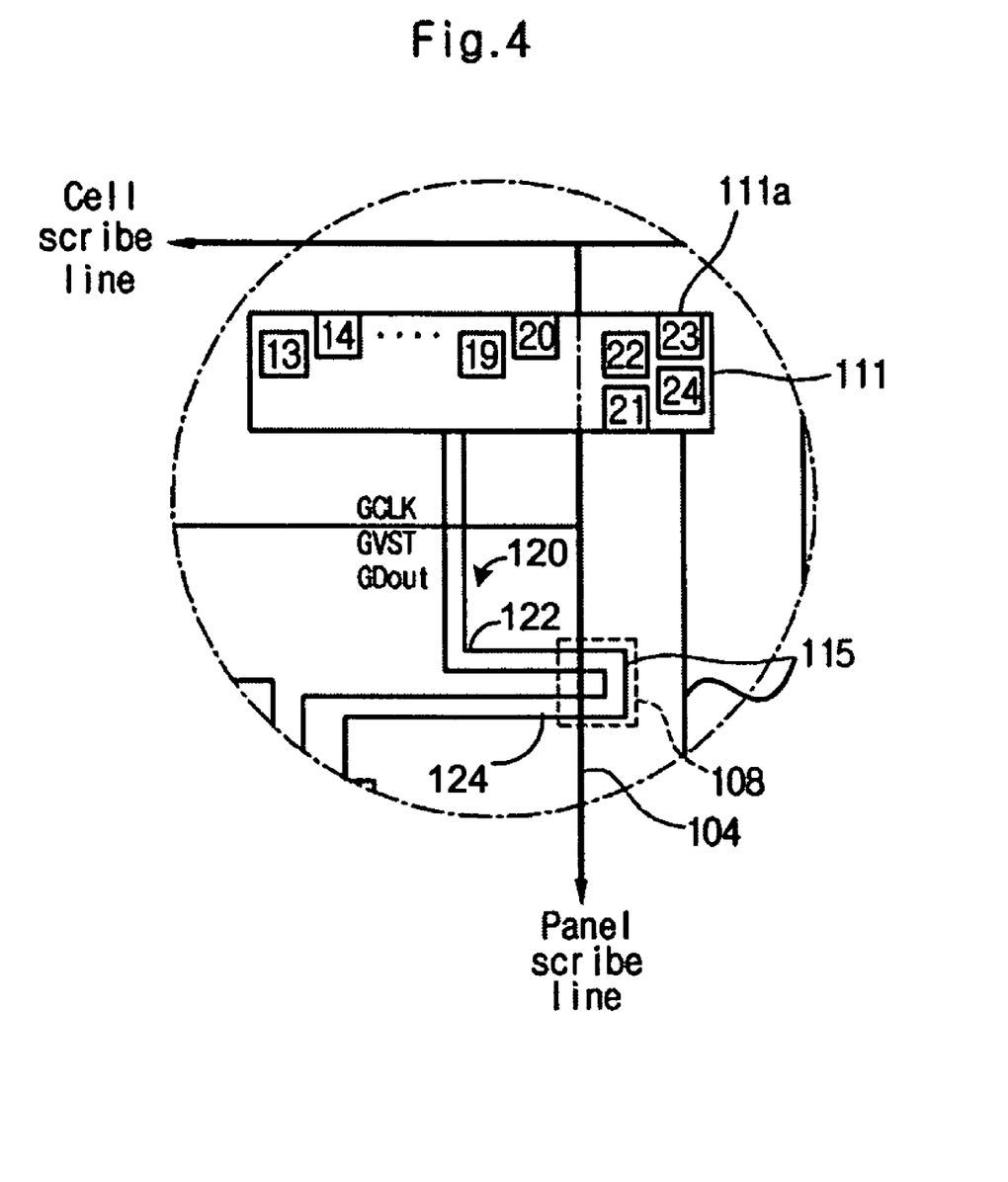
FIG. 4 is an enlarged view of the area B shown in FIG. 3.

FIG. 4 is an enlarged view of the area B shown in FIG. 3. FIG. 4 shows that the inspection pad set 111 may include individual inspection pads. The inspection pads 21, 22, 23, and 24 lie outside the scribing boundary defined by the scribing line 104. The inspection pads 13, 14, 19, and 20 line inside the scribing boundary defined by the scribing line 104. FIG. 4 also shows that the signal line 115 includes an extension portion 108 that extends across the scribing boundary 104.

As a result, cutting the cell 100 along the second scribe line 104 may break all signal lines that include an extension portion over the scribing boundary. The cut may also removes the inspection pads that lie outside the scribing boundary. Additional grinding is not needed.

For example, in FIG. 4, the inspection signal line 120 includes a first portion 122 and a second portion 124. The portion 122 is connected to an inspection pad and terminates at the panel scribing boundary 104 after the cell is cut. The portion 124 is connected to the active area 112a and also terminates at the panel scribing boundary 104 after the cell is cut. The cut removes the extension portions 108, thereby disconnecting the active area from the inspection pads by breaking one or more inspection signal lines.

Figure 5:
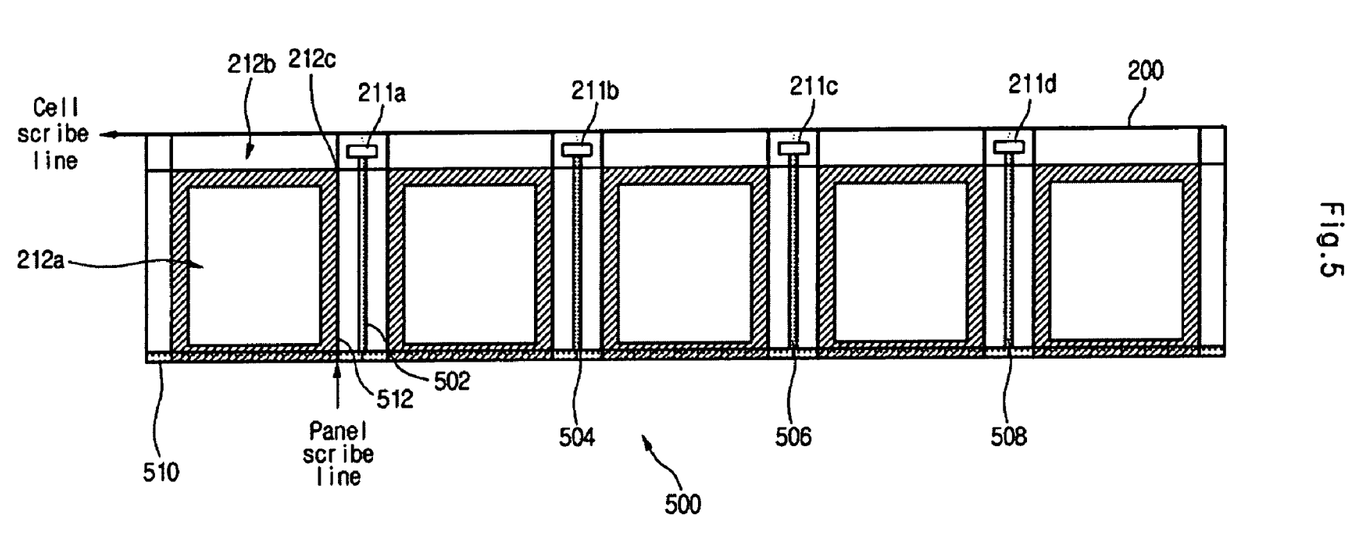
FIG. 5 illustrates the structure of a liquid crystal cell.

FIG. 5 illustrates the structure of a liquid crystal cell 500 that was obtained by cutting a larger substrate along the cell scribe line 200. The cell 500 includes five LCD panels and active areas 212a, inactive areas 212b, and inspection pads 211a, 211b, 211c, and 211d. Signal lines 502, 504, 506, 508, and 510 may connect the inspection pads 211a-d to the gate, data, control, or other connections of one or more of the active areas 212a.

The signal lines 502-510 may extend through the inactive region 212b or the adjacent regions 212c around or near the active areas 212a. The adjacent regions 212c may include data pads, gate pads, or other circuits that connect to the signal lines 502-510. The signal lines 510 may extend along the cell 500 to connect signal lines between one or more of the LCD panels in the cell 500.

The signal lines 502-510 may be individually allocated to data, gate, control, or other types of test signals. For example, the signal lines 502 may carry color data signals, the signal lines 504 may carry transistor gate signals, and the signal lines 506 may carry clock, control, or other signals. The inspection pads 211a-d may provide data, gate, control, or other types of test connection points that coupled to the corresponding signal lines 502, 504, 506, and 508.

Test signals may be simultaneously applied through the inspection pads 211a-d to multiple LCD panels in the cell 500. The test signals may be cell inspection signals, for example that attempt to activate or deactivate LCD panel pixels. The cell inspection signals may simultaneously test multiple LCD panels.

The inspection pads 211a, 211b, 211c and 211d and the signal lines 502-510 may be formed in whole or in part outside the scribing boundary delineated by the second scribe lines 512. Cutting the LCD panels may cut, disconnect, or remove any or all of the inspection pads 211a, 211b, 211c and 211d and the signal lines 502-510. A separate grinding step may be omitted.

Figure 6:
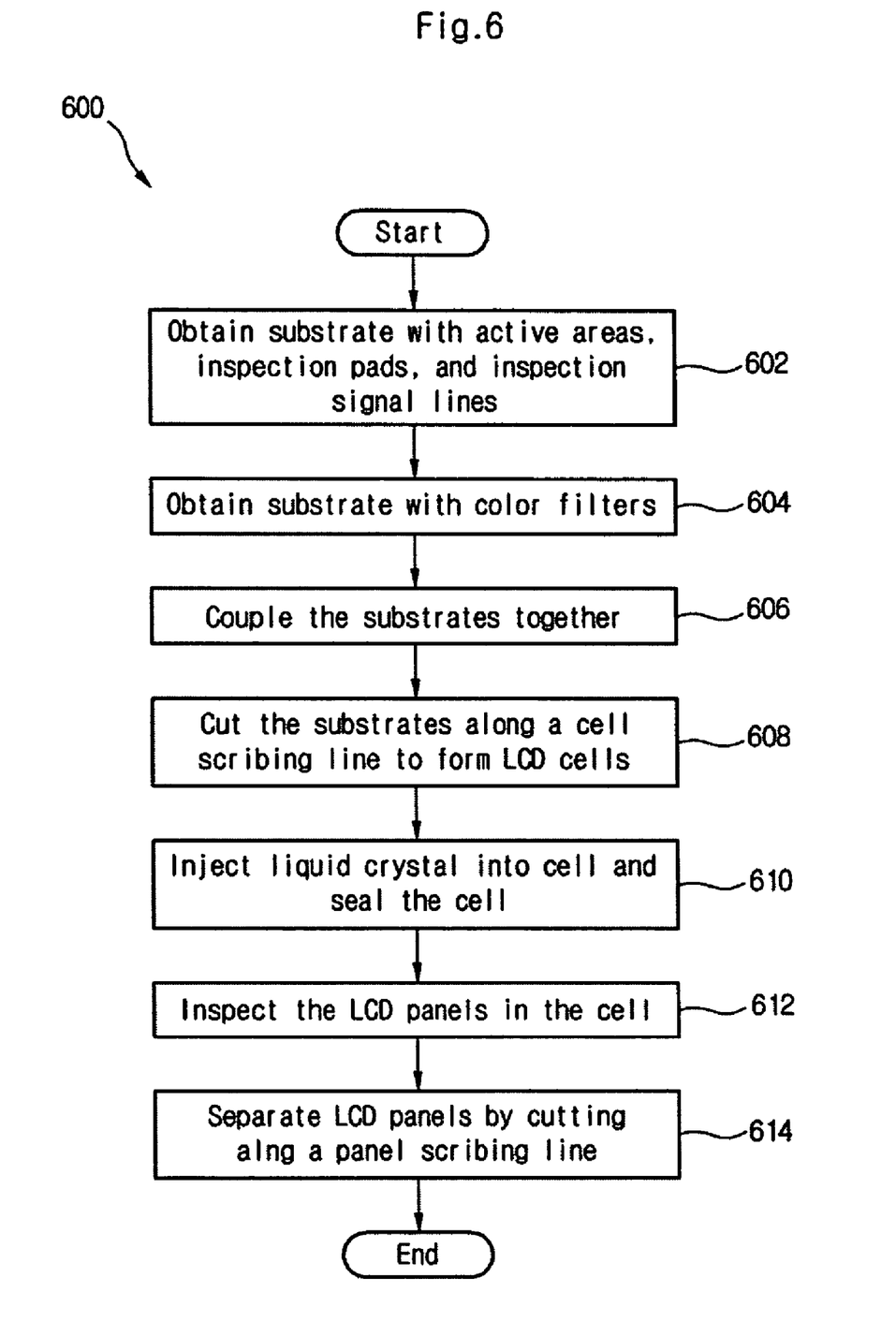
FIG. 6 shows a manufacturing method for an LCD Panel.

FIG. 6 shows a manufacturing method 600 for an LCD panel. The method may include obtaining an LCD substrate with active areas (Act 602), inspection pads, and inspection signal lines. One or more inspection pads may lie outside a scribing boundary, and one or more inspection signal lines may lie across the scribing boundary. The method also includes obtaining a substrate with filters such as color filters (Act 604). The substrates are coupled together (Act 606).

The substrates are cut along a cell scribing line to form one or more LCD cells (Act 608). Each cell may include one or more LCD panels. Each LCD panel may be filled with liquid crystal and sealed (Act 610).

One or more of the LCD panels in the cell may be inspected (Act 612). Data, gate, and control signals may be applied to the inspection pads. The data, gate, and control signals may activate pixels in the active areas to determine if any pixels are faulty and may perform other tests on the LCD panels. After testing, the LCD panels may be separated from the cell by cutting along a second scribing boundary (Act 614).

While the present invention has been shown and described in connection with the preferred embodiments, it will be apparent to those skilled in the art that modifications and variations can be made without departing from the spirit and scope of the invention as defined by the appended claims.

What is claimed is:

1. An LCD substrate comprising:
an inactive area comprising a gate inspection pad connected to a gate signal line for providing inspection signals for cell inspection, and a data inspection pad connected to a data signal line for providing inspection signals for cell inspection;
an active area comprising a gate pad and a data pad formed around the active area and operative in response to inspection signals applied to the inspection pads, the active area including transistors, pixel electrodes, gate lines and data lines; and
a subscribe line for cuffing the LCD substrate;
wherein the gate signal line has a first gate portion, a second gate portion, and a gate extension portion, and the data signal line has a first data portion, a second data portion, and a gate extension portion,
wherein the first and second gate portions are disposed at a first side area of the subscribe line, and the gate extension portion is disposed at a second side area of the subscribe line,
wherein the gate inspection pad is connected to the first gate portion at one end of the first gate portion, the gate pad is connected to the second gate portion at one end of the second gate portion, and the gate extension portion is connected to another end of the first gate portion and another end of the second gate portion at the subscribe line,
wherein the first and second data portions are disposed at the first side area of the subscribe line, and the data extension portion is disposed at the second side area of the subscribe line, and
wherein the data inspection pad is connected to the first data portion at one end of the first data portion, the data pad is connected to the second data portion at one end of the second data portion, and the data extension portion is connected to another end of the first data portion and another end of the second data portion at the subscribe line.

2. An LCD manufacturing method comprising:
obtaining a first substrate comprising an inspection pad for providing inspection signals for cell inspection, a panel subscribe line for cutting the first substrate, gate and data pads formed around an active area, a signal line for connecting the inspection pad and one of the gate and data pads; and
cutting the first substrate along the panel subscribe line,
wherein the signal line and the inspection pad are located in an inactive area,
wherein the signal line has a first portion, a second portion, and an extension portion,
wherein the first and second portions are disposed at a first side area of the subscribe line, and the extension portion is disposed at a second side area of the subscribe line, and
wherein the inspection pad is connected to the first portion at one end of the first portion, the one of the gate and data pads is connected to the second portion at one end of the second portion, and the extension portion is connected to another end of the first portion and another end of the second portion at the subscribe line.

3. The method of claim 2, further comprising:
obtaining a second substrate comprising a color filter layer; and
coupling the first substrate to the second substrate.

4. The LCD manufacturing method according to claim 3, further comprises cutting the coupled substrates along a cell subscribe line into cells, each cell comprising a plurality of LCD panels.

5. The LCD manufacturing method according to claim 3, further comprising:
injecting liquid crystal between the substrates; and
sealing the substrates to prevent leakage of the liquid crystal.

6. The LCD manufacturing method of claim 3, further comprising:
cutting the sealed substrates to obtain LCD panels.

* * * * *

UNITED STATES PATENT AND TRADEMARK OFFICE
CERTIFICATE OF CORRECTION

PATENT NO.         : 7,649,585 B2                                                                  Page 1 of 1
APPLICATION NO.    : 11/002019
DATED              : January 19, 2010
INVENTOR(S)        : Hun Jeoung et al.

It is certified that error appears in the above-identified patent and that said Letters Patent is hereby corrected as shown below:

In the Claims

In column 5, claim 1, line 49, after "a subscribe line for" replace "cuffing" with --cutting--.

Signed and Sealed this

First Day of June, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,649,585 B2 | Page 1 of 1 |
| APPLICATION NO. | : 11/002019 | |
| DATED | : January 19, 2010 | |
| INVENTOR(S) | : Jeoung et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1137 days.

Signed and Sealed this

Twenty-third Day of November, 2010

David J. Kappos
*Director of the United States Patent and Trademark Office*